United States Patent
Hios

(10) Patent No.: US 7,305,773 B2
(45) Date of Patent: Dec. 11, 2007

(54) HAND TOOL

(76) Inventor: Rudy Hios, P.O. Box 3793, Chester, VA (US) 23831

( * ) Notice: Subject to any disclaimer, the term of this patent is extended or adjusted under 35 U.S.C. 154(b) by 0 days.

(21) Appl. No.: 11/737,983

(22) Filed: Apr. 20, 2007

(65) Prior Publication Data

US 2007/0245581 A1 Oct. 25, 2007

Related U.S. Application Data

(60) Provisional application No. 60/794,424, filed on Apr. 24, 2006.

(51) Int. Cl.
*B43L 7/027* (2006.01)
(52) U.S. Cl. .......................................... 33/429; 33/482
(58) Field of Classification Search .................. 33/429, 33/427, 451, 474, 479–485, 492, 562, 613, 33/42
See application file for complete search history.

(56) References Cited

U.S. PATENT DOCUMENTS

| | | |
|---|---|---|
| 778,808 A | 10/1904 | Starrett |
| 3,670,418 A | 6/1972 | Hamilton, Jr. |
| 4,338,725 A | 7/1982 | Martin et al. |
| 4,375,724 A | 3/1983 | Brock |
| 4,380,872 A | 4/1983 | Moran |
| 4,598,482 A * | 7/1986 | Castleton ..................... 33/482 |
| 4,641,435 A | 2/1987 | Brown |
| 4,914,825 A | 4/1990 | Howard |
| 5,339,530 A | 8/1994 | Wright |
| 6,233,789 B1 | 5/2001 | Douglas |
| 6,550,153 B1 * | 4/2003 | Keith ........................... 33/482 |
| 6,553,677 B2 * | 4/2003 | Szumer ......................... 33/480 |
| 6,578,278 B2 * | 6/2003 | Siefert ......................... 33/429 |
| 6,758,016 B2 * | 7/2004 | Gobeil ......................... 33/429 |
| 6,785,976 B1 | 9/2004 | Morehouse |
| 6,996,911 B1 | 2/2006 | Dinius |
| 7,117,606 B2 | 10/2006 | Brown |
| 7,178,252 B1 | 2/2007 | Belagrd |
| 2007/0026472 A1 | 2/2007 | Brown |

* cited by examiner

*Primary Examiner*—Yaritza Guadalupe-McCall
(74) *Attorney, Agent, or Firm*—John H. Thomas, PC

(57) ABSTRACT

A hand tool of a substantially hexagonal shape to facilitate a variety of tasks, such as pipefitting, is provided wherein the tool includes two 90-degree internal angles formed by the intersection of the sides of the tool. At least one slot is provided along and in the perimeter of the tool. Planar or geometric tools are selectively secured within the at least one slot.

8 Claims, 3 Drawing Sheets

HAND TOOL

This application claims the benefit of filing of U.S. patent application No. 60/794,424, filed Apr. 24, 2006.

FIELD OF THE INVENTION

The present invention relates in general to the art of hand tools and, more specifically, to a combination square tool with an integrated level. The hand tool of the present invention is roughly hexagonal in shape and includes means to secure planar tools on four sides in a square pattern.

BACKGROUND OF THE INVENTION

Squaring tools and pipe fitting tools have been developed over the years with incremental but significant improvements. Each generation of improvements increases the tools' functionality and the ability of an operator to perform a task more efficiently, precisely, and the like. A number of tools have been directed to joining two structural members, such as pipes, beams, or the like, in a 90-degree relationship.

Pipe fitting, in particular, is often a two-person job that requires a team effort to complete a predetermined piping layout. The positioning of the pipes must occur quickly and correctly. To this end, pipe fitters need to create "square" connections (90 degree joints). Pipes must also be properly spaced to allow room for other piping or structural assemblies Existing tools fail to provide multi-angle spacing of two or more structural members at a distance (i.e., the members/pipes may not be directly joined to each other).

For pipe fitting, once the pipes are put in place, a welder secures the pipes together. Often the pipe fitter's tools are mistakenly tack welded to the adjoining pipes or otherwise damaged in the process. It would be desirable to have a pipe fitting or hand tool for creating a square connection that allowed easy access to the jointed members (pipe, stair stringer, etc.)

Many known tools only provide for one 90-degree measurement. However, it is often necessary to measure the spacing of the pipes in several directions. It would be helpful to have a tool that could hold or secure straight edges, squares, or other tools on four sides of the tool. While previous tools have been useful for their intended purpose, several problems remain.

As such, there is a need for an inexpensive and efficient hand tool for construction and pipe fitting projects that would allow the user to secure four substantially planar tools, such as carpenter squares, straight edges, and the like onto the tool. Ideally, a new hand tool could accommodate substantially planer tools of various sizes. In other words, the squares, rulers, straight edges, and the like would not have to have a uniform thickness. The hand tool would be operable to work with attachable tools of various proportions. The hand tool of the present invention solves one or more of the above or other needs.

SUMMARY OF THE INVENTION

In accordance with the present invention, an improved combination hand tool is provided that facilitates the positioning and alignment of structural members, such as pipes, boards, and the like. The hand tool provides a planar body with a substantially hexagonal shape. At least one channel or slot located along the perimeter of the tool is adaptable to secure geometric tools of a variety of sizes and shapes. Fasteners, such as thumbscrews, are operable to selectively secure the various tools.

Certain embodiments of the present invention would include additional features for added tool functionality. For instance, an integrated level would provide a visual indication of a level condition in one or more planes. In a preferred embodiment, the level would provide a visual indication of a level condition in at least three planes. In another preferred embodiment, industrial magnets embedded in the tool act to anchor the tool against a metal surface. Overall, the roughly hexagonal shape and unique ability to secure up to four geometric tools would increase the functionality and applicability of such a tool over known hand tools.

The hand tool of the present invention can be formed from any type of suitable material, including aluminum, iron, steel, plastic, and the like. In one embodiment, the hand tool provides a unitary, substantially planar body made of metal.

The tool's shape roughly or substantially defines a hexagon. Each exterior side of the tool (i.e., the sides forming the perimeter of the planar tool body) includes a first end and second end. A first side meets second and third sides at 135-degree interior angles at the respective first and second ends of the first side. Therefore, one end of each of the second and third sides terminates at the first side. The second ends of the second and third sides form 90-degree internal angles to join respective fourth and fifth sides. A sixth side would then connect the fourth and fifth sides to define a substantially hexagonal perimeter. However, the sixth side is linear, but is recessed to facilitate use of the tool. Each opposing side of the tool is parallel to form a substantially hexagonal shape.

The opposing sides of the tool are also of the same length. As such, each 90-degree internal angle, which are located at the intersection of the second to fourth sides and third to fifth sides, are directly opposite the corresponding 90-degree angle. The 90-degree angles are opposing in that a line bisecting either of the two angles would bisect the opposite angle as well.

The first, second, third, fourth and fifth sides define a first thickness with a channel or slot formed along part or all of the length of the respective sides. The channel(s) or slot(s) is, therefore, on the exterior side of the hexagonal shape. Planar tools, such as square edges, rulers, straight edges, or the like, can be inserted into the channels. Fasteners, such as thumbscrews, pass through the tool body to selectively engage tools placed in the slot(s). The attachable tools are held in place by fasteners.

In one preferred embodiment, the first side includes embedded magnets. In another preferred embodiment, a level is also embedded or placed within the body of the tool. The level indicates a level condition in at least one plane and, in a preferred embodiment, the level indicates a level condition in at least three planes.

The sixth side is recessed relative to the substantially hexagonal shape defined by the sides. In one embodiment, the sixth side is also of a reduced thickness relative to the thickness of the planar tool body defined by sides one through five.

A relatively thin, planar bridge connects to the interior of each side of the hand tool (i.e., sides one-six). In a preferred embodiment, the thickness of the bridge has a similar or identical thickness as the sixth side of the hand tool. Openings are included in the bridge so that a user can grasp and manipulate the tool via the relatively thin bridge.

While the above highlights particular features of the invention in order that the detailed description thereof may be better understood, and in order that the present contribution to the art may be better appreciated, there are additional features of the invention that will be described hereinafter. Also, it is to be understood that the phraseology and terminology employed herein are for the purpose of the description and should not be regarded as limiting.

BRIEF DESCRIPTION OF DRAWINGS

The foregoing, and additional objects, features, and advantages of the present invention will become apparent to those of skill in the art from the following detailed description of a preferred embodiment thereof, taken in conjunction with the accompanying drawings, in which.

DETAILED DESCRIPTION OF THE APPLICATION

Figure 1:
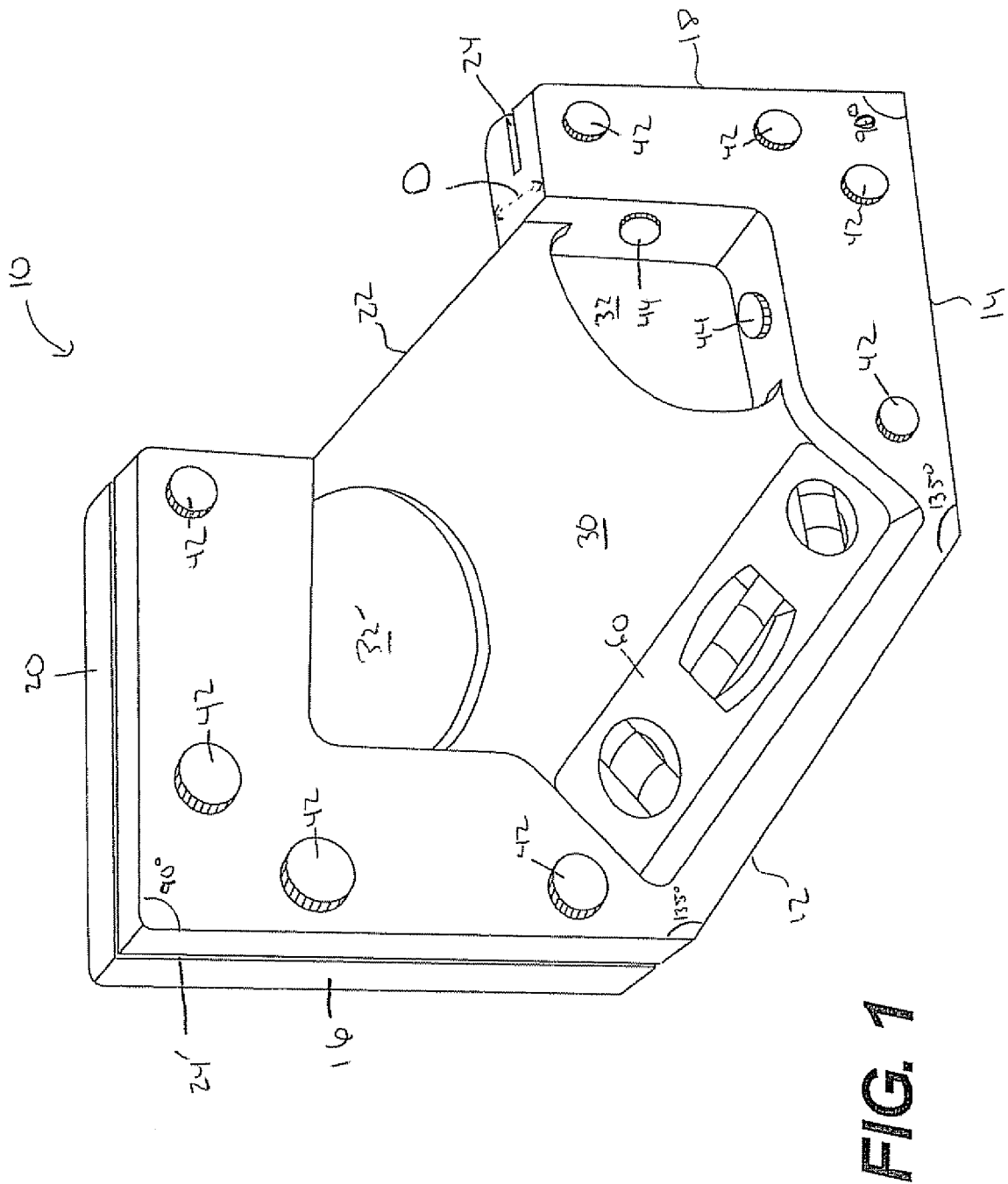
FIG. 1 is a perspective view of one embodiment of the hand tool of the present invention.
Figure 2:
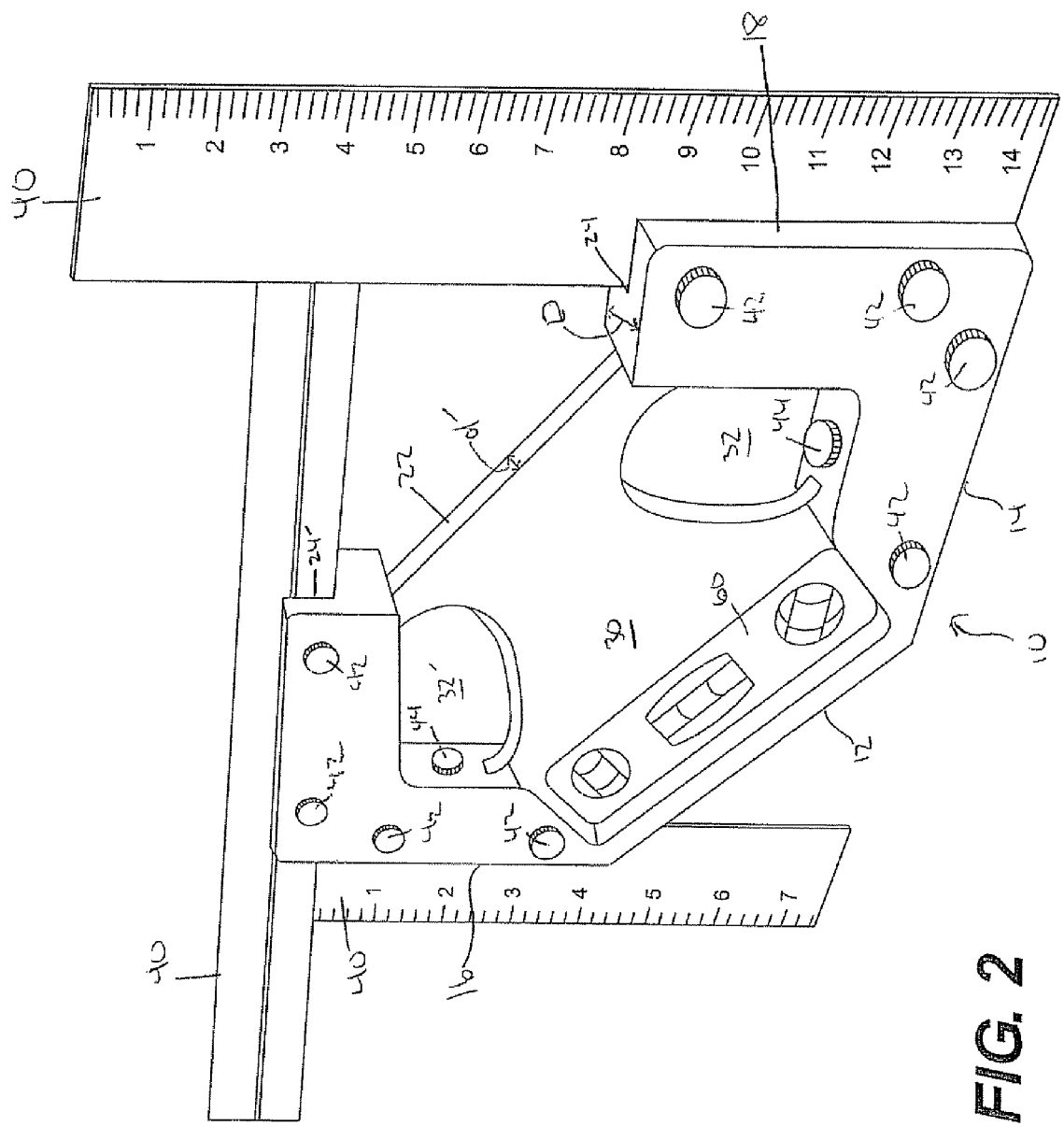
FIG. 2 is an additional perspective view thereof wherein geometric instruments are secured to channels in the hand tool in accordance with one embodiment of the present inventions.
Figure 3:
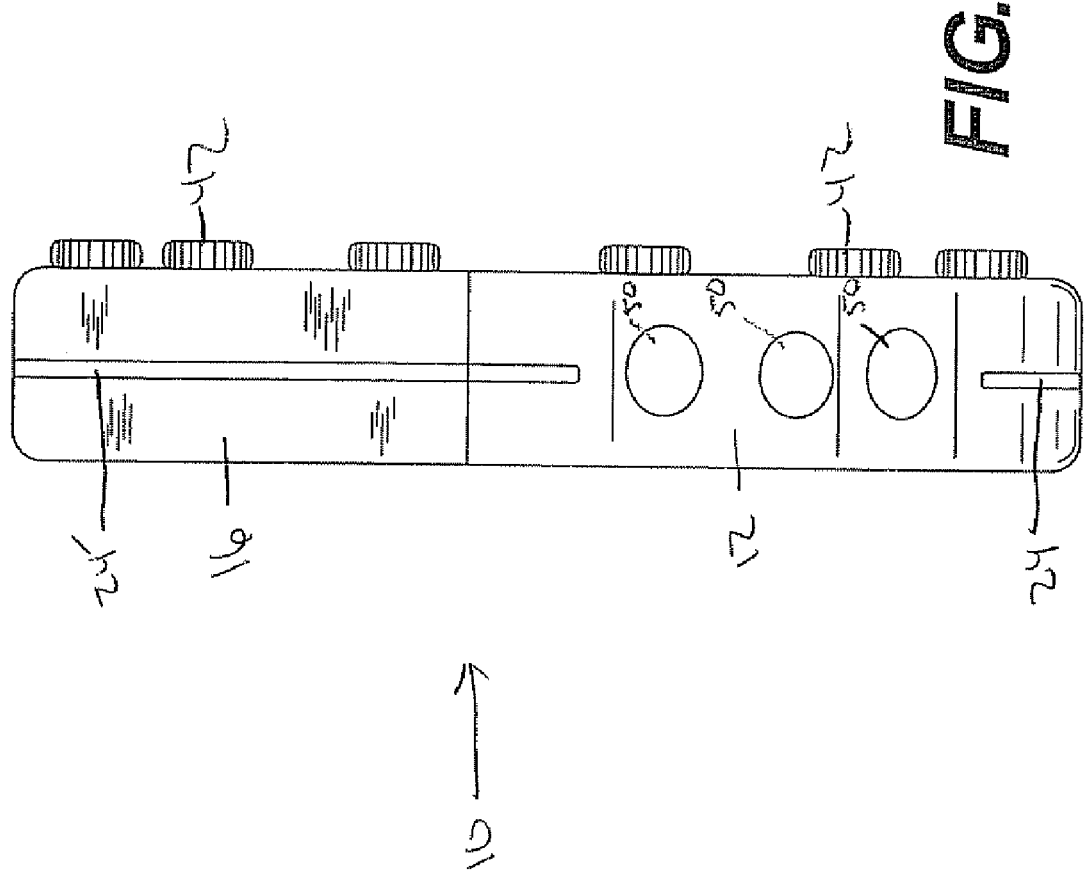
FIG. 3 is an additional perspective view thereof.

Turning now to a more detailed description of the present invention, there is illustrated in FIGS. 1 to 3 embodiments of the hand tool of the present invention. The illustrated embodiments explain and illustrate the construction, context, and applicability of the present invention to one of skill in the art of construction, pipe fitting, and the like.

The specific types of construction or other tasks that are facilitated by the use of the present invention in general will not be described in extensive detail inasmuch as such details are known to those skilled in the art. Moreover, the hand tool will be useful for tasks and jobs that have yet to be contemplated. The hand tool is adaptable for operation within a variety of construction, plumbing, engineering or other fields.

Turning to FIG. 1, there is illustrated a hand tool 10 of a roughly hexagonal shape. The hand tool of the present invention can be formed from any type of suitable material, including aluminum, iron, steel, plastic, and the like. In one embodiment, the hand tool provides a unitary, substantially planar body made of metal.

The tool's shape roughly or substantially defines a hexagon. As such, there are six exterior sides to tool 10. A first side 12 meets a second side 14 and a third sides 16 at 135-degree interior angles at the respective first and second ends of first side 12. Second side 14 and third side 16 join first side 12 to a fourth side 18 and a fifth side 20. The intersections of second side 14 to fourth side 18 and third side 16 to fifth side 20 form 90-degree internal angles. A sixth side 22 connects fourth side 18 and fifth side 20 to define a substantially hexagonal perimeter. However, while sixth side 22 is linear like the remaining sides of the substantially hexagonal tool, the sixth side is recessed from the perimeter of tool. Therefore, tool 10 is substantially hexagonal with sixth side 22 recessed from the perimeter of tool defined by the remaining sides of the otherwise hexagonal tool.

As illustrated, each side of the tool is parallel to the opposing side. Therefore, first side 12 is parallel to recessed sixth side 22, second side 14 is parallel to fifth side 20, and fourth side 18 is parallel to third side 16. The opposing sides are also of substantially equal lengths.

The dimensions of tool 10 dictate that each 90-degree internal angle, which are located at the intersection of the second to fourth sides and third to fifth sides, is directly opposite the corresponding 90-degree angle. As such, a line bisecting either of the two angles would bisect the opposite angle as well.

The first, second, third, fourth and fifth sides define a first thickness D. The 'thickness' of the planar body, as used herein, is the dimension of the body taken perpendicular to the plane defined by the longitudinal axis of the tool. At least one channel or slot 24 is formed along part or all of the length of the respective sides. The at least one channel/slot is, therefore, on the perimeter of tool 10. Planar or geometric tools, such as square edges, rulers, straight edges, or the like, can be inserted into the channels. Fasteners, such as thumbscrews, pass through the tool body to selectively engage tools placed in the slot(s) (as further described below). The attachable tools are held in place by the fasteners. In one embodiment, a first slot 24 wraps around the perimeter of the tool through the length of fourth side 18, second side 14, and a portion of first side 12. A second slot 24' wraps around the perimeter of the tool through the length of fifth side 20, third side 16, and a portion of first side 12. The first and second slots are not connected. In addition, it is envisioned that tool 10 can include just one of slots 24, 24' or that a single slot 24 can mm the full length of each of the first through fifth sides.

With references to FIGS. 1 and 2, and as described above, sixth side 22 is recessed relative to the substantially hexagonal shape otherwise defined by the first through fifth sides. In one embodiment, sixth side 22 is also of a reduced thickness d' relative to the thickness of the planar tool body defined by the first through five sides. The recessed structure and reduced thickness d' of sixth side 22 provides a means to better grip or handle tool 10. A user can then use the dimensions of the tool, with or without selectively attached geometric tools, to measure or place structural members, such as pipes. As best seen in FIG. 2, the addition of geometric tools would otherwise limit the ability to hold the tool by sixth side 22 if sixth side 22 were not recessed from the perimeter otherwise defined by the first through fifth sides.

A relatively thin, planar bridge 30 connects to the interior of each side of the hand tool (i.e., the first through sixth sides). In a preferred embodiment, the thickness of bridge 30 is substantially the same as or identical to thickness d' as provided by sixth side 22 of hand tool 10. Optional openings 32, 32' are included in bridge 30 so that a user can better grasp and manipulate tool 10 via relatively thin bridge 30.

As briefly described above, and as illustrated in FIG. 2, one or more geometric or planar tools 40 can be inserted into the at least one slot found along the perimeter of tool 10. The ability to add straightedges, rulers, squares, and the like creates a number of mechanisms that the tool user can customize to meet the demands of a particular task. Therefore, the tool is adaptable to wide variety of uses within the fields of pipefitting, general construction, and the like. In fact, a huge variety of measuring options are available. For instance, the attached tools 40 can be used to properly space structural elements (stair stringers, cross members, or the like). Hand tool 10 could also be used for drafting purposes.

Tools 40 are selectively secured to tool 10 by a number of fasteners 42. Fasteners 42 may be screws, thumbscrews, or other known fasteners that are operable to apply pressure to tools 40 in slots 24, 24'. In one embodiment, fasteners 42 are thumbscrews inserted into threaded apertures located in tool 10 where the threaded apertures are perpendicular to the plane of the at least one tool slot. The axis of each aperture intersects with the corresponding slot. In use, the user threads thumbscrew 42 into the aperture until the thumbscrew engages tool 40. Pressure applied by the thumbscrew holds the tool in place. Of course, it is envisioned that tool 10 may have one continuous slot, one truncated slot 24, or a plurality of slots 24, 24', as illustrated in FIGS. 1-3.

Additional depth adjustment means 44 or tool engaging means 44 are provided via a plurality of thumbscrews, screws, or other type fastener. These fasteners are in-plane with the channel 24 or channel 24'. These fasteners/thumbscrews provide a shaft with a notched or semi-spherical end to better hold a tool within the channel. As a depth adjustment mechanism, fasteners 44 are inserted through an aperture wherein the aperture is in-plane with slot 24 or slots 24, 24'. Users access the depth adjustment mechanism 44 or tool engaging means 44 via openings 32 and/or 32'. In one embodiment, the depth adjustment mechanism 44 is a thumbscrew. Threading the thumbscrew into the aperture engages the edge of a tool 40 to either selectively hold the tool in place or to adjust the depth of the tool within the respective slot. In another embodiment, mechanism 44 is a threaded post with a nut operable to move the post into and out of the slot. As the post engages a tool 40, the depth of the tool within the respective slot is adjusted.

With reference now to FIG. 3, as envisioned for one embodiment of the present invention, first side 12 includes embedded magnets 50. Magnets 50 are operable to mount tool 10 to a metal member, such as a pipe.

In another embodiment, a level 60 is also embedded or placed within the body of tool 10. The level indicates a level condition in at least one plane. In another embodiment, the level indicates a level condition in at least three planes via known indicating mechanism (e.g., a bubble in a fluid filled tube).

Overall, the substantially hexagonal shape of hand tool 10 and the ability to affix various planar tools along up to five sides of the tool creates an extremely versatile and useful tool in a variety of construction fields. The integrated level provides a level indicator in three planes so that the hand tool can be leveled when rotated to a number of positions, including the ability to create 45-degree connections. The integrated magnets are useful for holding the hand tool in place where desired. Additional magnets might be included along the exterior of any of the sides.

Although the present invention has been described in terms of one or more preferred embodiments, it will be understood that numerous variations and modifications may be made without departing from the invention. Thus, for example, the material or ornamental design of the hand tool can be varied without leaving the scope of the disclosed invention. Additional embodiments and uses of the hand tool will become apparent to one skilled in the art. Thus, it is to be understood that the invention may be practiced otherwise than as specifically described above.

What is claimed is:

1. A hand tool comprising
   a substantially planar tool body, the body having a first side, a second side, a third side, a fourth side, a fifth side, and a recessed sixth side, the first side parallel to the recessed sixth side, the second side parallel to the fifth side, and the third side parallel to the fourth side, each side defining the perimeter of the planar tool body, the perimeter defining a substantially hexagonal tool body;
   a first 90-degree interior angle defined by the intersection of the second and the fourth sides;
   a second 90-degree interior angle defined by the intersection of the third and the fifth sides;
   at least one slot provided in the first, second, and fifth sides; and
   wherein at least one geometric tool is selectively secured within the slot.

2. The hand tool of claim 1, further comprising fasteners operable to selectively secure the at least geometric tool.

3. The hand tool of claim 1, wherein the fasteners are thumbscrews.

4. The hand tool of claim 1, further comprising an integrated level, the level providing a visual indication of a level condition at least three planes.

5. The hand tool of claim 1, further comprising magnets in the tool body, the magnets operable to secure the hand tool to a metal surface.

6. The hand tool of claim 1, wherein the first, second, third, fourth and fifth sides define a first thickness, the slot formed along part or all of the length of each of the first, second, third, fourth, and fifth sides;
   wherein the sixth side is of a reduced thickness relative to the thickness of the planar tool body defined by sides one through five; and
   a relatively thin, planar bridge, the bridge connecting the interior of each side of the hand tool, the thickness of the bridge being substantially the same as the thickness of the sixth side of the hand tool.

7. The hand tool of claim 1, wherein the slot is provided in the first, second, third, fourth, and fifth sides.

8. The hand tool of claim 1, wherein the at least one slot comprises a first slot in the first, second, and fourth sides and a second slot in the first, third, and fifth sides; and wherein the first slot and the second slot are not connected.

* * * * *